United States Patent
Bian et al.

(10) Patent No.: US 11,693,184 B2
(45) Date of Patent: *Jul. 4, 2023

(54) WAVEGUIDE ATTENUATOR

(71) Applicant: GLOBALFOUNDRIES U.S. INC., Malta, NY (US)

(72) Inventors: Yusheng Bian, Ballston Lake, NY (US); Won Suk Lee, Malta, NY (US); Abdelsalam A. Aboketaf, Essex Junction, VT (US)

(73) Assignee: GLOBALFOUNDRIES U.S. INC., Malta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,487

(22) Filed: May 20, 2022

(65) Prior Publication Data

US 2022/0283375 A1 Sep. 8, 2022

Related U.S. Application Data

(63) Continuation of application No. 16/919,867, filed on Jul. 2, 2020, now Pat. No. 11,378,747.

(51) Int. Cl.
*G02B 6/26* (2006.01)
*G02B 6/122* (2006.01)
*G02B 6/293* (2006.01)
*G02B 6/12* (2006.01)

(52) U.S. Cl.
CPC ............ *G02B 6/26* (2013.01); *G02B 6/1228* (2013.01); *G02B 6/266* (2013.01); *G02B 6/29331* (2013.01); *G02B 2006/12126* (2013.01)

(58) Field of Classification Search
CPC .................................................. G02B 6/29331
See application file for complete search history.

(56) References Cited

U.S. PATENT DOCUMENTS

| | | |
|---|---|---|
| 2,557,110 A | 6/1951 | Jaynes |
| 2,619,538 A | 11/1952 | Grant |
| 3,787,871 A | 1/1974 | Reese |
| 4,799,031 A | 1/1989 | Lang et al. |
| 6,897,498 B2 | 5/2005 | Gothoskar et al. |

(Continued)

FOREIGN PATENT DOCUMENTS

| | | |
|---|---|---|
| CA | 3059510 | 10/2018 |
| WO | 2005057253 | 6/2005 |

OTHER PUBLICATIONS

Ken Giewont et al.,"300-mm Monolithic Silicon Photonics Foundry Technology", IEEE Journal of Selected Topics in Quantum Electronics, vol. 25, No. 5, Sep./Oct. 2019, 12 pages.

(Continued)

*Primary Examiner* — Eric Wong
(74) *Attorney, Agent, or Firm* — Anthony Canale; Andrew M. Calderon; Calderon Safran & Cole, P.C.

(57) ABSTRACT

The present disclosure relates to semiconductor structures and, more particularly, to waveguide attenuators and methods of manufacture. The structure includes: a main bus waveguide structure; a first hybrid waveguide structure evanescently coupled to the main bus waveguide structure and comprising a first geometry of material; and a second hybrid waveguide structure evanescently coupled to the main bus waveguide structure and comprising a second geometry of the material.

19 Claims, 7 Drawing Sheets

(56) References Cited

U.S. PATENT DOCUMENTS

| | | | |
|---|---|---|---|
| 7,002,429 | B2 | 2/2006 | Asao et al. |
| 9,952,384 | B2 | 4/2018 | Volz |
| 10,551,567 | B2 * | 2/2020 | Wang .................... G02B 6/2773 |
| 10,816,728 | B1 | 10/2020 | Bian et al. |
| 10,921,518 | B2 | 2/2021 | Barwicz |
| 11,360,268 | B1 * | 6/2022 | Ling ...................... G02B 6/125 |
| 2010/0296775 | A1 | 11/2010 | Png |
| 2014/0124669 | A1 | 5/2014 | Zheng et al. |
| 2015/0147023 | A1 | 5/2015 | Yamamoto |
| 2016/0216446 | A1 | 7/2016 | Kang et al. |
| 2017/0317471 | A1 | 11/2017 | Lor et al. |
| 2019/0219782 | A1 | 7/2019 | Liow et al. |
| 2019/0334048 | A1 | 10/2019 | Omelchenko et al. |
| 2021/0199887 | A1 | 7/2021 | Bian et al. |
| 2022/0137290 | A1 | 5/2022 | Aboketaf et al. |

OTHER PUBLICATIONS

Yusheng Bian et al.,"Hybrid vanadate waveguiding configurations for extreme optical confinement and efficient polarization management in the near-infrared". The Royal Society of Chemistry 2018, Nanoscale, 2018, 10 pages, 16667-16674.

Michal Rakowski et al.,"45nm CMOS—Silicon Photonics Monolithic Technology (45CLO) for next-generation, low power and high speed optical interconnects", OFC 2020 © OSA, 3 pages.

Dae Ho Jung., "Structural and electrical properties of transparent conductor SrVO3 thin films grown using radio frequency sputtering deposition", Journal of Vacuum Science & Technology, published Jan. 22, 2019, 10 pages.

Lei Zhang et al.,"Correlated metals as transparent conductors", Nature Materials, Dec. 2015, 18 pages.

Yusheng Bian et al., "Towards low-loss monolithic silicon and nitride photonic building blocks in state-of-the-art 300mm CMOS foundry", OSA frontiers in optics & laser science APS/DLS, FW5D. 2, Sep. 14-17, 2020, 2 pages.

Peng Xing et al., "Ultra-broadband and compact graphene-on-silicon integrated waveguide mode filters", Sientific Reports, Jun. 29, 2018, 9 pages.

Xiaoxi Wang et al., "Compact silicon photonic resonance-assisted variable optical attenuator", Optics Express, Nov. 28, 2016, vol. 24, No. 24, 14 pages.

Yue-Yang Yu et al., "The 650-nm variable optical attenuator based on polymer/silica hybrid waveguide", Chinese Physical Society and IOP Publishing Ltd, 2016, vol. 25, No. 5, 8 pages.

Yu Yu et al., "Silicon chip-scale space-division multiplexing: from devices to system", Science China Information Sciences, Aug. 2018, vol. 61, 19 pages.

F. P. Payne, "Control of Unwanted Light in Silicon Waveguide Circuits", IEEE, Dec. 2005, vol. 17, No. 12, 3 pages.

Daniel May-Arrioja et al., "Variable optical attenuator using active multimode interference waveguide", Proceedings of SPIE, Oct. 21, 2004, vol. 5622, 5 pages.

Bian et al., "Supplementary Information for: Hybrid vanadate waveguiding configuration for extreme optical confinement and efficient polarization management in the near-infrared", Aug. 2018, The Royal Society of Chemistry, p. 1-10. (Year: 2018).

* cited by examiner

WAVEGUIDE ATTENUATOR

FIELD OF THE INVENTION

The present disclosure relates to semiconductor structures and, more particularly, to waveguide attenuators and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

Open or unconnected ports or other termination points of the photonics device can result in leakage or backscatter of the optical signal back into the chip. This can also cause crosstalk with other photonic devices, as well as overall interference of the optical signal. To prevent such issues from occurring, an absorber is coupled to the photonics device. The absorbers are known to be manufactured from Ge material as they are easily integrated into the fabrication processes of the photonics devices. However, Ge absorbers suffer from relatively high optical return loss (e.g., back-reflection and backscatter) which, in turn, can significantly impede the optical strength of the signal. Backscattering into lasers can result in instability and additional laser noise. Additionally, it can lead to degraded high-speed signal integrity and increased bit-error-rate of communication links.

SUMMARY

In an aspect of the disclosure, a structure comprises: a main bus waveguide structure; a first hybrid waveguide structure evanescently coupled to the main bus waveguide structure and comprising a first geometry of material; and a second hybrid waveguide structure evanescently coupled to the main bus waveguide structure and comprising a second geometry of the material.

In an aspect of the disclosure, a structure comprising: a first waveguide structure composed of semiconductor material; a second waveguide structure composed of the semiconductor material and which is partially coated with a polarization-independent transparent conductive material; and a third waveguide structure composed of the semiconductor material and which is partially coated with the polarization-independent transparent conductive material, differently than the second waveguide structure.

In an aspect of the disclosure, a structure comprising: a main bus waveguide structure comprising semiconductor material monolithically integrated into semiconductor on insulator (SOI) technology; a first hybrid waveguide structure comprising the semiconductor material monolithically integrated into the SOI technology, the first hybrid waveguide structure further comprising a partial coating of vanadate based material which has a first geometry which is structured to prevent reflection back to the main bus waveguide structure; and a second hybrid waveguide structure comprising the semiconductor material monolithically integrated into the SOI technology, the second hybrid waveguide structure further comprising a partial coating of vanadate based material which has a geometry different than the first geometry and which is structured to prevent reflection back to the main bus waveguide structure.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1:
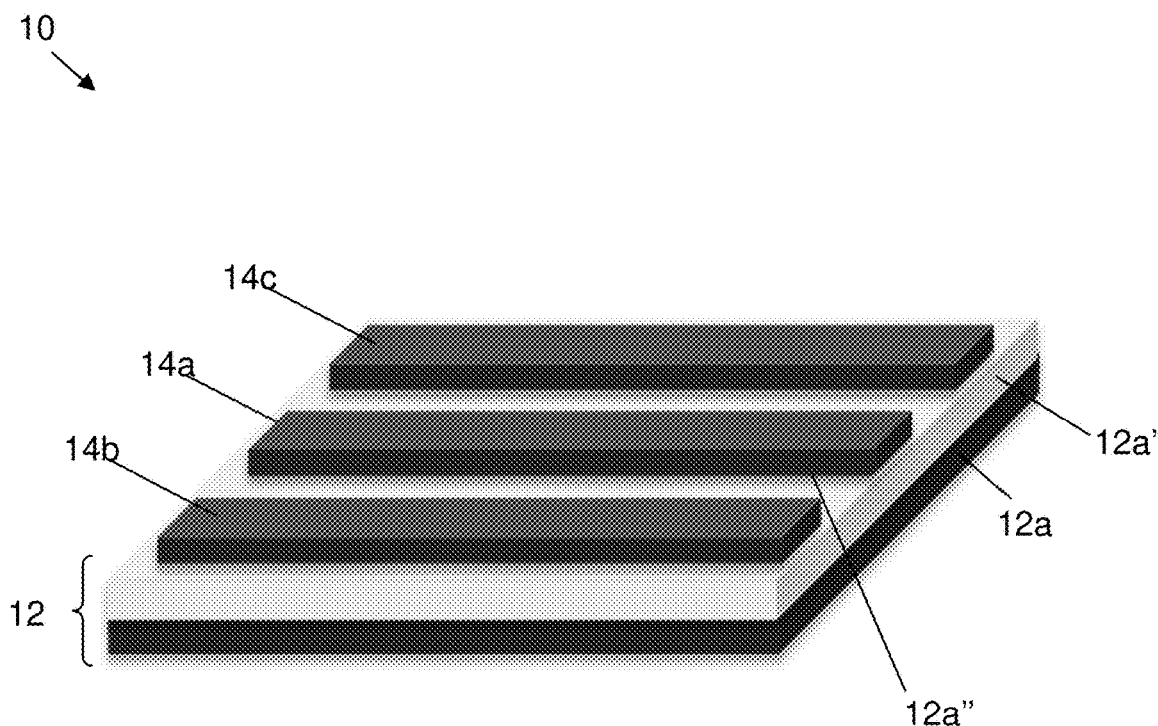
FIG. 1 shows a perspective view of a three channel waveguide structure, amongst other features, and respective fabrication processes in accordance with aspects of the present disclosure.

The present disclosure relates to semiconductor structures and, more particularly, to waveguide attenuators and methods of manufacture. More specifically, the present disclosure provides a three channel waveguide structure which includes a polarization-independent transparent conductive oxide (e.g., vanadate) material coating the attenuator which is based on a semiconductor on insulator (SOI) platform. Advantageously, the waveguide attenuators are designed and structured to reduce the optical return loss of waveguide-integrated absorbers by combining Si or SiN with vanadate (or similar) materials.

In embodiments, the waveguide structures are ultra-compact monolithic structures composed of vanadate coated (covered) Si structures or vanadate coated SiN structures, as examples. More specifically, in embodiments, the waveguide attenuators comprise a main Si (or SiN) bus waveguide and two hybrid (stacked) Si-vanadate (or SiN) waveguides that are evanescently coupled to the main bus waveguide. In further examples, the waveguide structures can be based on other material systems, e.g., III-V, SiON, AN, polymer, etc., coated with vanadate based materials, e.g., $CaVO_3$, $SrVO_3$, etc. (or other materials with similar properties) to form integrated monolithic photonic waveguides and components. The use of vanadate material can be used to attenuate both transverse-electric (TE) mode and transverse-magnetic (TM) mode for Si or SiN waveguides with minimized back reflection. In fact, the use of vanadate material has been found to provide improved absorption coefficient (attenuation) for both polarizations, e.g., TE and TM modes. Accordingly, the use of vanadate material will provide ultra-low optical return loss for both TE and TM input (polarization independent).

In further embodiments, the vanadate coated waveguide structures can be provided in many different geometries and/or configurations such as, e.g., a taper, hybrid taper with cascaded tapers and/or straight sections. By way of examples, the waveguide structures can include the following configurations: (i) adiabatic tapers in the input region; (ii) adiabatic bends in the input region; (iii) both adiabatic tapers and bends in the input region; (iv) tapered waveguide structures in combination with the above options; and (v) stacked vanadate attenuator for reduced TM optical return loss, i.e., back reflection. Moreover, the waveguide structures described herein can be used for other functional photonics components (e.g., bends, couplers, etc.), which can easily be integrated in a photonics integrated circuit.

The waveguide attenuators of the present disclosure can be manufactured in a number of ways using a number of different tools. In general, though, the methodologies and tools are used to form structures with dimensions in the micrometer and nanometer scale. The methodologies, i.e., technologies, employed to manufacture the waveguide attenuators of the present disclosure have been adopted from integrated circuit (IC) technology. For example, the structures are built on wafers and are realized in films of material patterned by photolithographic processes on the top of a wafer. In particular, the fabrication of the waveguide attenuators uses three basic building blocks: (i) deposition of thin films of material on a substrate, (ii) applying a patterned mask on top of the films by photolithographic imaging, and (iii) etching the films selectively to the mask.

FIG. 1 shows a perspective view of a three channel waveguide structure, amongst other features, and respective fabrication processes in accordance with aspects of the present disclosure. In particular, the structure 10 shown in FIG. 1 includes a substrate 12 comprising semiconductor on insulator (SOI) technologies. For example, in the SOI technologies, the substrate 12 includes a wafer 12a, e.g., Si wafer, an insulator layer 12a', and a semiconductor substrate 12a". The semiconductor substrate 12a" is preferably composed of Si material; although other semiconductor materials are also contemplated herein, e.g., III/V or II/VI compound semiconductors, SiON, AN, polymer, etc. Moreover, the semiconductor substrate 12a" may comprise any suitable crystallographic orientation (e.g., a (100), (110), (111), or (001) crystallographic orientation). The insulator layer 12a' is provided between the Si wafer 12a and the semiconductor substrate 12a". The insulator layer 12a' may comprise any suitable material, including silicon oxide, sapphire, other suitable insulating materials, and/or combinations thereof. An exemplary insulator layer 12a' is a buried oxide layer (BOX). The insulator layer 12a' and the semiconductor substrate 12a" may be formed by any known fabrication methods, e.g., SiMOX, such that no further explanation is required for a complete understanding of the present disclosure.

Still referring to FIG. 1, a plurality of photonics components (e.g., waveguide structures) 14a, 14b, 14c are formed from the semiconductor substrate 12a". In this way, the plurality of waveguide structures 14a, 14b, 14c form a monolithic structure with the substrate 12. As should be understood by those of skill in the art, the waveguide structures 14b, 14c will be evanescently coupled to the waveguide structure 14a. In embodiments, the waveguide structure 14a is a main bus waveguide; whereas, the waveguide structure 14b will be used to attenuate a TE mode and the waveguide structure 14c will be used to attenuate a TM mode, independently from one another.

In the implementation shown in FIG. 1, for example, the waveguide structures 14a, 14b, 14c are patterned directly from semiconductor substrate 12a", e.g., Si or other semiconductor material using conventional CMOS fabrication processes as discussed herein, including a thinning of the material. For example, a resist formed over the semiconductor substrate 12a" is exposed to energy (light) to form a pattern (opening). An etching process with a selective chemistry, e.g., reactive ion etching (RIE), will be used to remove semiconductor substrate 12a" through the openings of the resist. The resist can then be removed by a conventional oxygen ashing process or other known stripants, leaving the waveguide structures 14a, 14b, 14c fully integrated with the substrate 12. In the scenario that the waveguide structures 14a, 14b, 14c comprise SiN compound semiconductors, SiON, AN, polymer, etc., the material can be fully or partially etched material on an oxide material.

Figure 2:
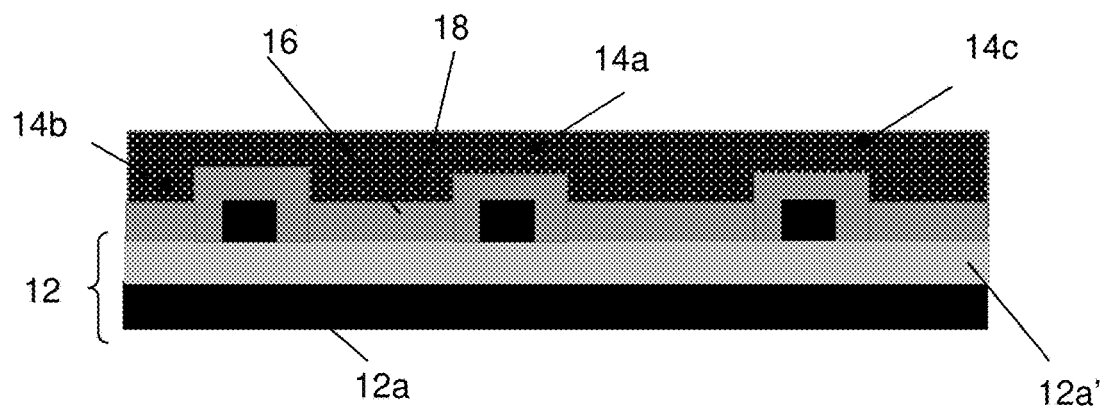
FIG. 2 shows waveguide structures coated with vanadate material, amongst other features, and respective fabrication processes in accordance with aspects of the present disclosure.

FIG. 2 shows the waveguide structures 14a, 14b, 14c coated with a vanadate material, amongst other features. More specifically, the waveguide structures 14a, 14b, 14c are first coated with an insulator material 16, e.g., oxide. The insulator material 16 can be blanket deposited over the waveguide structures 14a, 14b, 14c and the insulator layer 12a' by any conventional deposition method including chemical vapor deposition (CVD) processes. As further described herein, the insulator material 16 can be optimized to different thicknesses on the waveguide structures 14b, 14c.

A polarization-independent transparent conductive oxide material 18 (or other materials with similar material properties) is deposited over the insulator material 16, followed by a planarization process. In embodiments, the polarization-independent transparent conductive oxide material 18 can be a vanadate based material. For example, the vanadate based material can be $CaVO_3$ or $SrVO_3$, etc. It has been found after extensive experimentation that vanadate materials ($CaVO_3$, $SrVO_3$, etc.) demonstrate good transparent conducting (as with oxides) due to their opto-electronic properties. Moreover, vanadate materials demonstrate strong guiding properties and strong confinement that is difficult to achieve with existing materials currently integrated into photonics devices, e.g., Ge based absorbers.

The material 18 can be deposited using CVD or hybrid molecular beam epitaxy, pulsed laser deposition, pulsed electron evaporation, atomic layer deposition (ALD), etc. Typical growth temperature is around 350° C. — 500° C. The thickness of the material 18 can be optimized for different applications, e.g., TM mode or TE mode applications. In embodiments, for example, the thickness of the material 18 can be $2.0\lambda$ or greater, where $\lambda$ is the operating wavelength for each different waveguide structures 14b, 14c. Examples of different geometries are described further with reference to FIGS. 3A-4. Following the deposition process, the material 18 can be planarized using a chemical mechanical polishing (CMP) process known to those of skill in the art such that no further explanation is required for a complete understanding of the present disclosure.

FIGS. 3A-3H show different patterns (e.g., thicknesses, locations, etc.) of the material 18 on the waveguide structures 14b, 14c. In each of the embodiments described herein, the material 18 will be removed from the main bus waveguide structure 14a; whereas, the material 18 will be patterned or deposited into different geometries (e.g., locations, thicknesses, etc.) on the waveguide structures 14b, 14c, optimized for the different transmission modes, e.g., TM mode and TE mode. The patterning of the waveguide structures 14a, 14b, 14c and, more specifically, the material 18 of the waveguide structures 14a, 14b, 14c is performed by conventional lithography and etching processes.

For example, a resist formed over the material 18 of the waveguide structures 14a, 14b, 14c is exposed to energy (light) to form a pattern (opening). An etching process with a selective chemistry, e.g., RIE, will be used to pattern the material 18 on the waveguide structures 14b, 14c and remove the material 18 from the main bus waveguide structure 14a. In embodiments, the etchant can be a dry etch with etchant chemistry of, for example, hot ammonia ($NH_3$) and/or hydrochloric acid (HCl) vapor. Following resist removal by a conventional oxygen ashing process or other known stripants, an interlevel dielectric material 20, e.g., oxide material, can be deposited over the waveguide structures 14a, 14b, 14c by a CVD process.

Figure 3A:
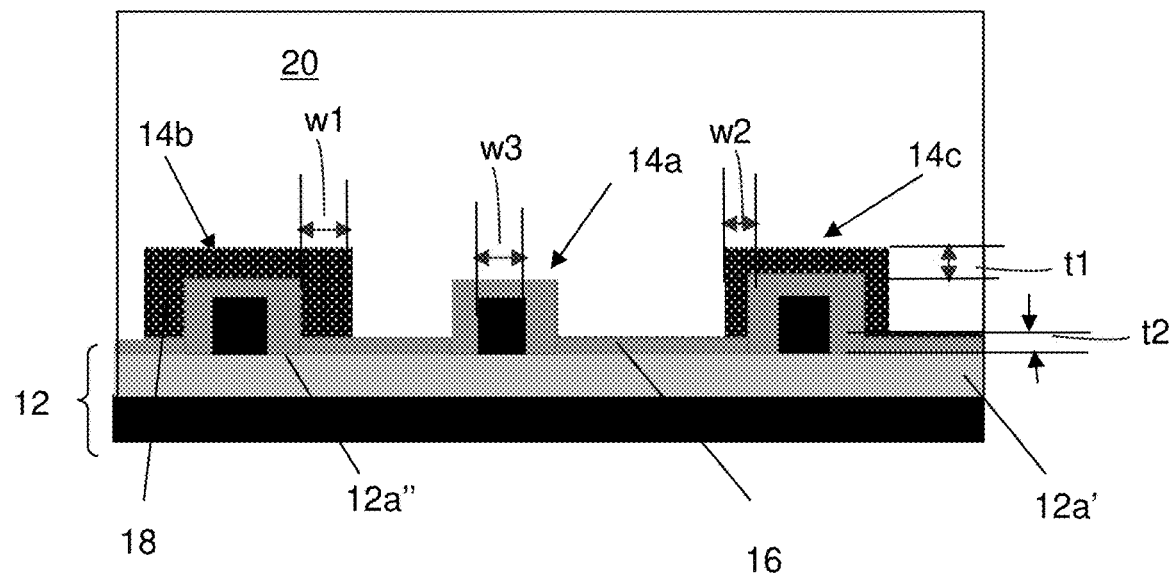
FIGS. 3A-3H show the waveguide structures with different vanadate material geometries, amongst other features, and respective fabrication processes in accordance with additional aspects of the present disclosure.

As in each of the embodiments described herein, the material 18 is patterned on the waveguide structure 14b to optimize the TE mode transmission; whereas, the material 18 is patterned on the waveguide structure 14b to optimize the TM mode transmission. For example, FIG. 3A shows the material 18 patterned differently on both waveguide structures 14b, 14c. In this example, the material 18 is patterned such that the width w1 on the sidewalls of the waveguide structure 14b can be from about 0.5λ to 2λ, with a thickness t1 on top of the waveguide structure 14b from about 0.02λ to 0.3λ. On the other hand, the width w2 on the sidewalls of the waveguide structure 14c can be from about 0.0λ to 0.4λ, with a thickness t1 on top of the waveguide structure 14c of about 0.02λ to 0.3λ. The width w3 of the semiconductor substrate 12a" for each waveguide structure 14a, 14b, 14c can be about 0.1λ to 2λ and the thickness t3 can be about 0.15λ to 0.3λ.

Moreover, the insulator layer 12a' can be about 0.0λ to 0.06λ. As in each of the embodiments, the insulator material 16 can also be removed from surfaces of the waveguide structure 14a; although having the insulator material 16 covering the main bus waveguide structure 14a may simplify the process, e.g., the oxide overlay for all three bus waveguide structures 14a, 14b, 14c can be formed simultaneously. It is also noted that the device, e.g., waveguide structures 14a, 14b, 14c, is typically covered with oxide cladding or back-of-the-line (BEOL) dielectric cladding (which is typically made of multiple low-index dielectric materials), either of which can be represented at reference numeral 20 in FIGS. 3A-3H.

Figure 3B:
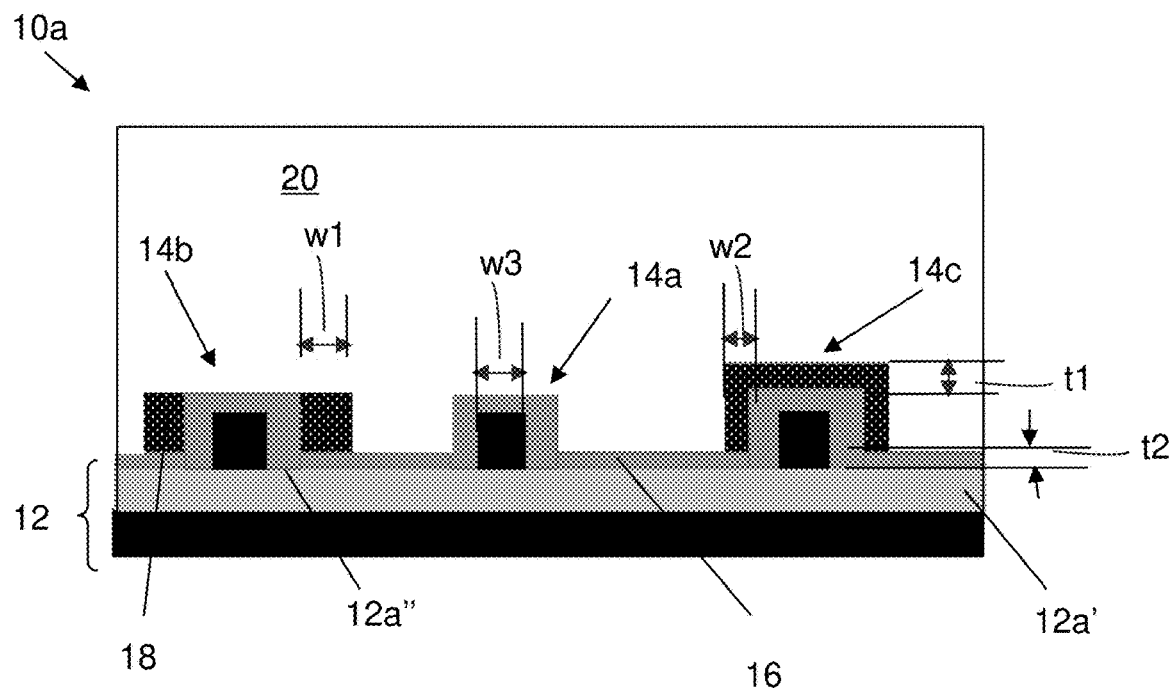

FIG. 3B shows a structure 10a where the material 18 is removed from a top surface of the waveguide structure 14b, e.g., removed from the insulator material 16. In this embodiment, after an initial etching processes to remove the material 18 from the waveguide structure 14a, an anisotropic etching process can be utilized to remove any unwanted material 18 from the top surface of the waveguide structure 14b, while protecting the material 18 on the waveguide structure 14c. As should be understood by those of skill in the art, the anisotropic etching process will etch the material 18 on the horizontal surfaces of the waveguide structure 14b and over the insulator layer 12a'. In this way, the material 18 will be provided on sidewalls of the waveguide structure 14b.

Figure 3C:
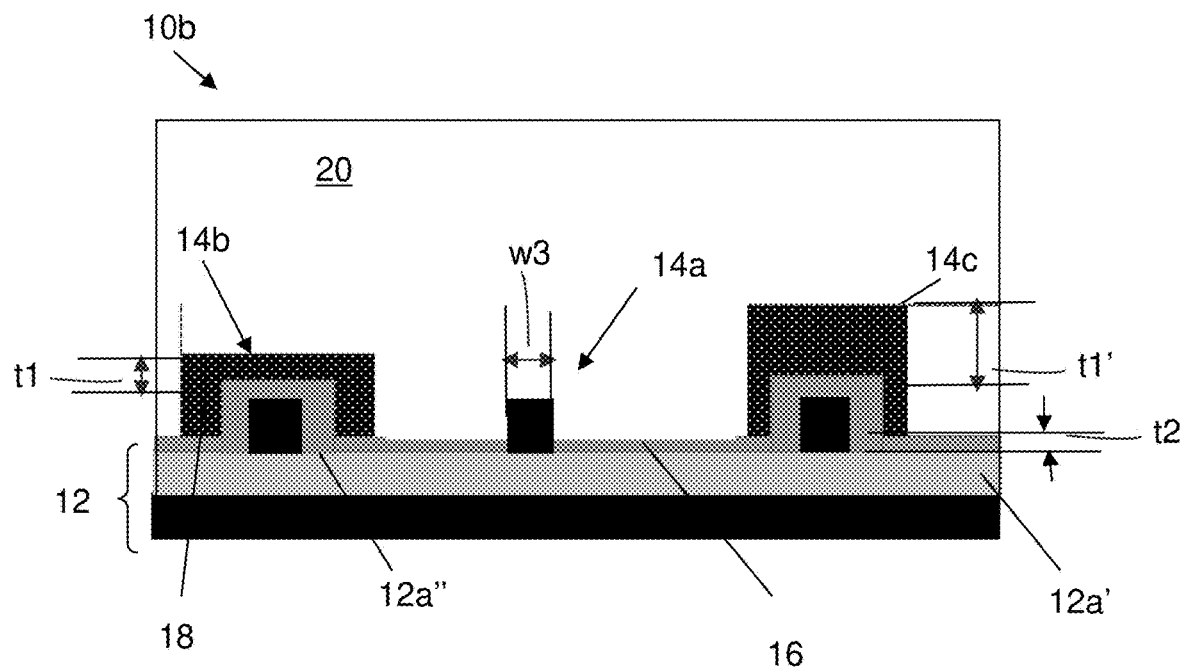

In FIG. 3C, the structure 10b includes the material 18 on a top surface of the waveguide structure 14c with a different thickness than on a top surface of the waveguide structure 14b. More specifically, in this embodiment, the material 18 has a first thickness t1' on the top surface of the waveguide structure 14c and a second thickness t1 on the top surface of the waveguide structure 14b, where t1'>t1. In this embodiment, the thickness t1', t1 of the material 18 can be optimized or tuned by separate etching or planarization processes as is known in the art such that no further explanation is required for a complete understanding of the present disclosure. In optional embodiments, the insulator material 16 can also be removed from surfaces of the waveguide structure 14a.

Figure 3D:
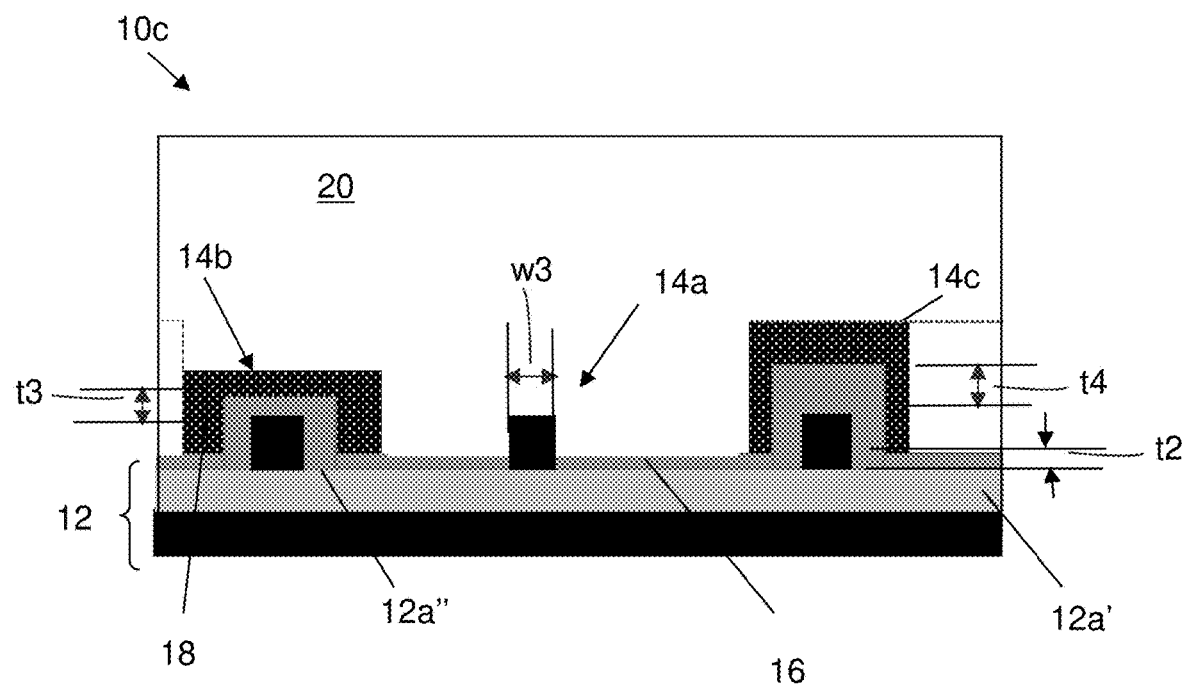

FIG. 3D shows a structure 10c which has insulator material 16 with a different thickness over the waveguide structures 14b, 14c. In this embodiment, for example, the insulator material 16 has a thickness t3 on the top surface of the waveguide structure 14b and a thickness t4 on the top surface of the waveguide structure 14c, where t4>t3. In this embodiment, the thickness t3, t4 of the insulator material 16 can be optimized or tuned by separate etching or planarization processes as is known in the art such that no further explanation is required for a complete understanding of the present disclosure. In optional embodiments, the insulator material 16 can also be removed from surfaces of the waveguide structure 14a.

Figure 3E:
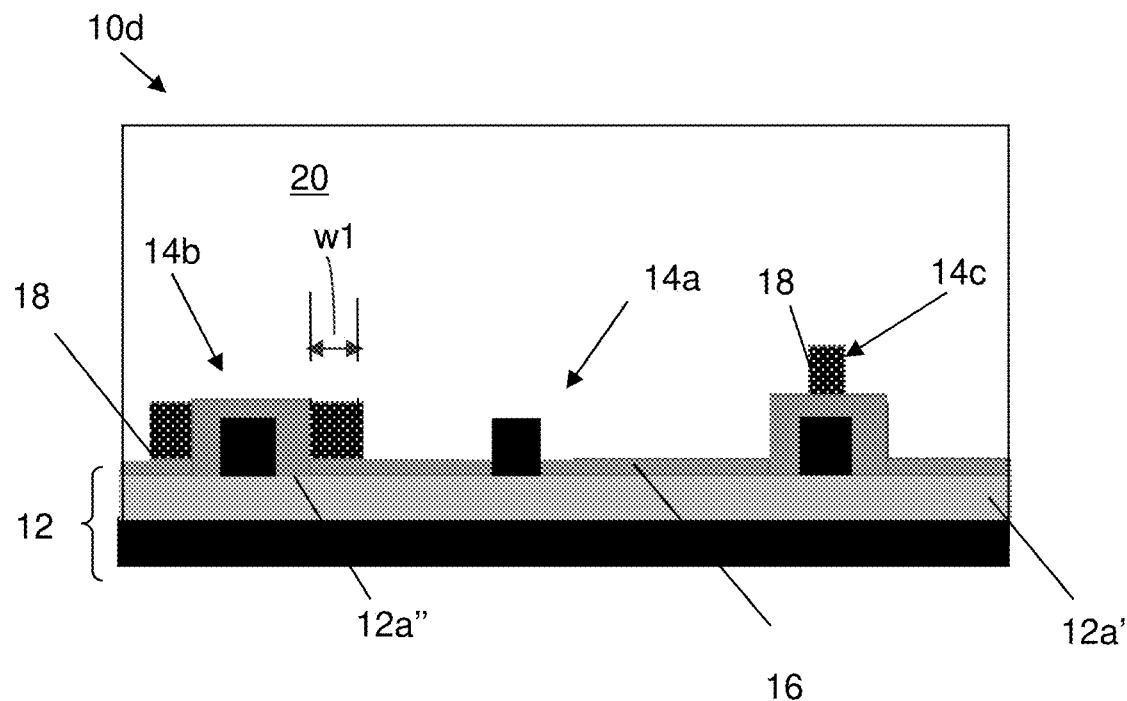

FIG. 3E shows a structure 10d which has the material 18 removed from a top surface of the waveguide structure 14b and sidewalls of the waveguide structure 14c, e.g., removed from the insulator material 16. In this embodiment, after an initial etching processes to remove the material 18 from the waveguide structure 14a, an anisotropic etching process can be utilized to remove any unwanted material 18 from the top surface of the waveguide structure 14c, while protecting the material 18 on the waveguide structure 14b. In addition, the material 18 can be partially removed from a top surface of the waveguide structure 14c and fully removed from the sidewalls of the waveguide structure 14c using conventional lithography and etching processes as already described herein. Also, in alternative embodiments, the material 18 can remain fully on a top surface of the waveguide structure 14c, depending on the optimized parameters for the waveguide structure 14c. In optional embodiments, the insulator material 16 can also be removed from surfaces of the waveguide structure 14a.

Figure 3F:
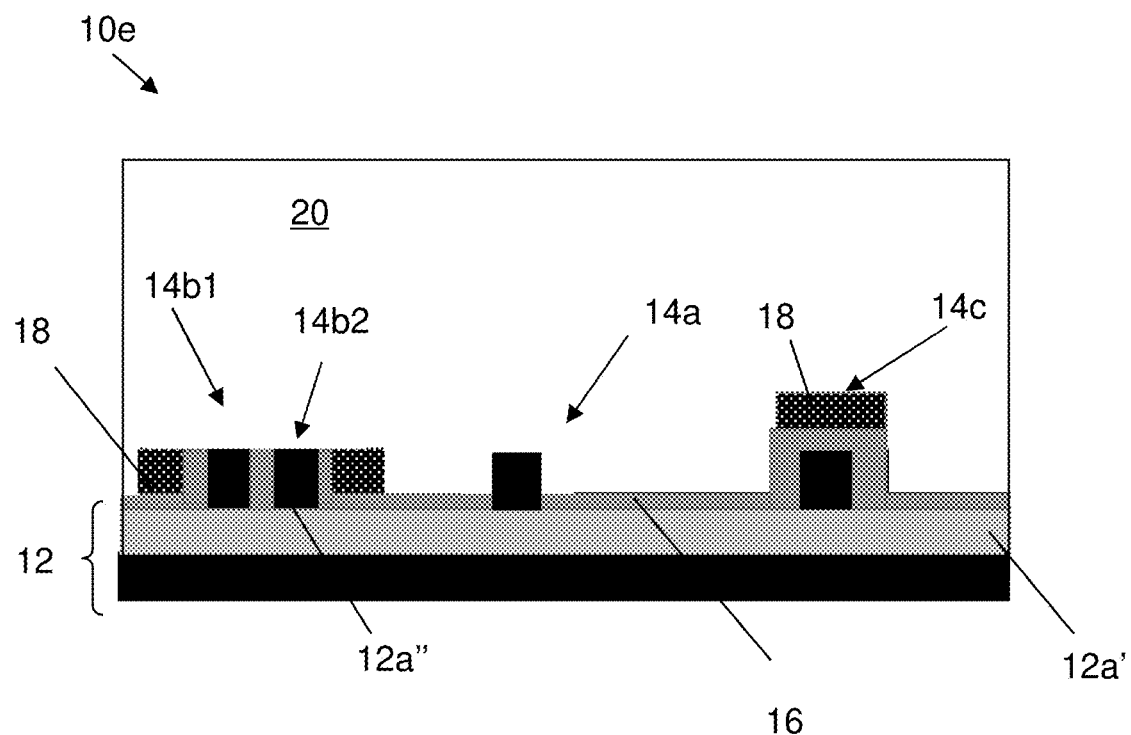

In FIG. 3F, the structure 10e includes a slotted waveguide structure, e.g., waveguide structures 14b1, 14b2 formed from the semiconductor material 12a" (or SiN). The slotted waveguide structures 14b1, 14b2 are separated by the insulator material 16, with the material 18 remaining on opposing sidewalls (or a sidewall closest to the main bus 14a) of the slotted waveguide structures 14b1, 14b2, similar to that described with respect to FIG. 3E. In embodiments, the insulator material 16 can also be removed from a top surface of the slotted waveguide structures 14b1, 14b2. Moreover, in this embodiment, the waveguide structure 14c will include the material 18 fully or partially on a top surface thereof, similar to that described in FIG. 3E. This embodiment aims to better couple and interact the TE mode with bus waveguide structure 14b1, 14b2, as well as attenuate the TE waveguide mode more efficiently.

Figure 3G:
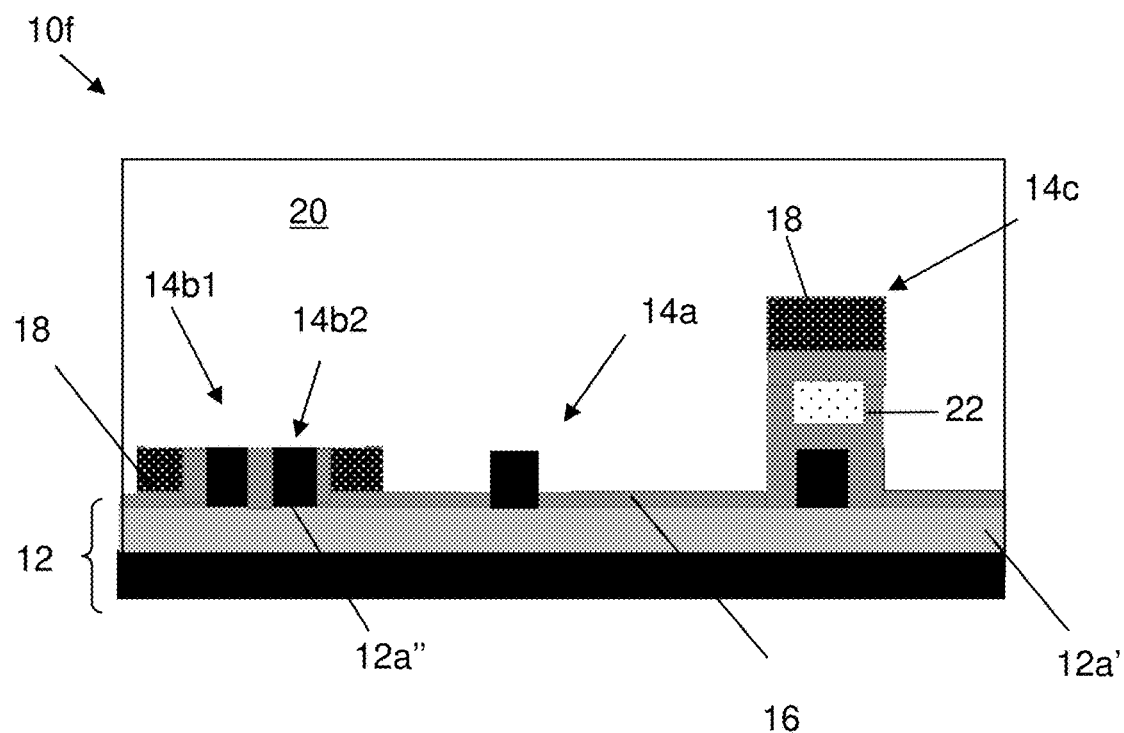

FIG. 3G shows a structure 10f with a slotted waveguide structure, e.g., waveguide structures 14b1, 14b2 formed from the semiconductor material 12a" (or SiN), in addition to a stacked waveguide structures 14c. As in the embodiment of FIG. 3F, the slotted waveguide structures 14b1, 14b2 are separated by the insulator material 16, with the material 18 remaining on opposing sidewalls (or a sidewall closest to the main bus 14a) of the slotted waveguide structures 14b1, 14b2. In embodiment, the insulator material 16 can also be removed from a top surface of the slotted waveguide structures 14b1, 14b2. Moreover, in this embodiment, the waveguide structures 14c is a stacked structure with crystallized material 22 underneath the material 18, with the oxide material 16 separating the crystallized material 22 from the material 18 and the substrate material 12a″ of the waveguide structures 14c. The crystallized material 22 can be crystalized Si-Poly-Si or Si—SiN, as examples. This embodiment aims to improve TE mode and TM mode performance.

Figure 3H:
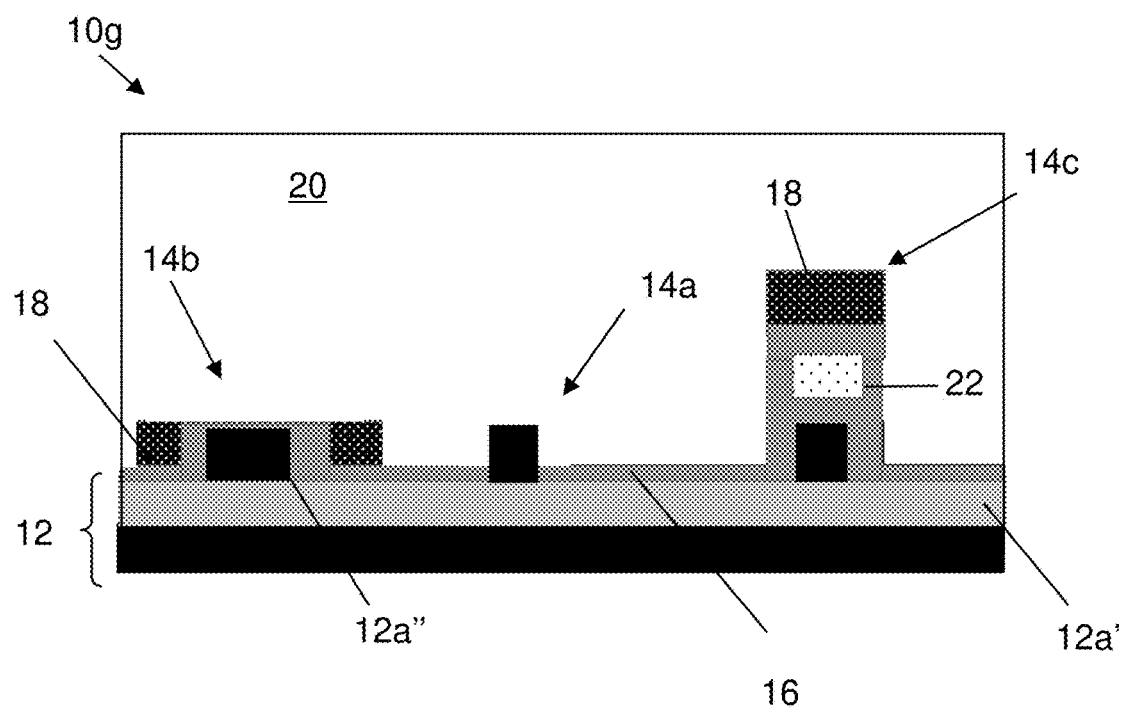

FIG. 3H shows a structure 10g where the waveguide structure 14b is s stacked waveguide structures 14c. This embodiment aims to better couple and interact the TM mode with main bus waveguide 14a, as well as attenuate the TM waveguide mode more efficiently.

Figure 4:
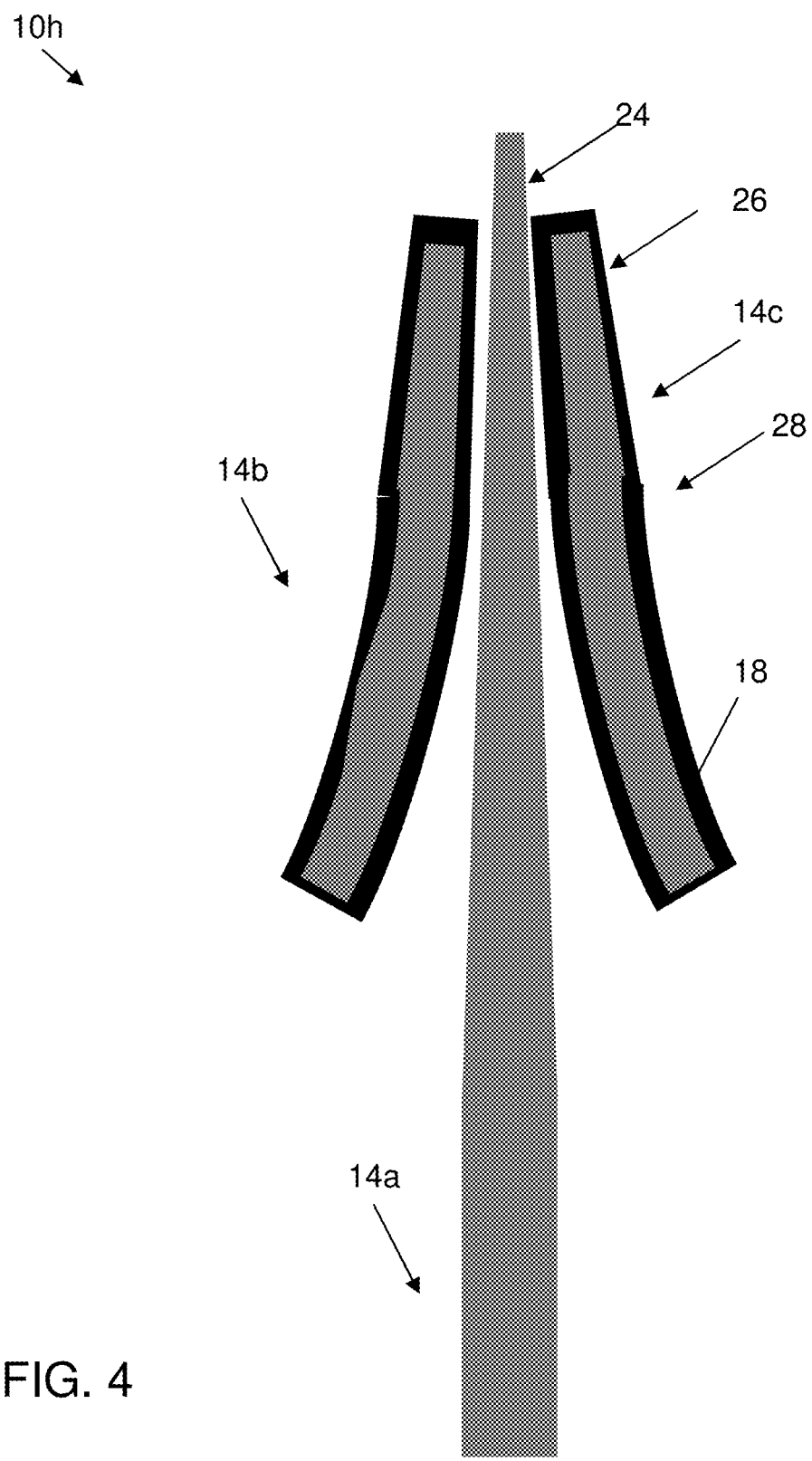
FIG. 4 shows a top view of a three channel waveguide structure with tapers and bends, amongst other features, and respective fabrication processes in accordance with additional aspects of the present disclosure.

FIG. 4 shows a top view of a three channel waveguide structure 10h comprising waveguide structures 14a, 14b, 14c. In this configuration, the main bus waveguide structure 14a includes a tapered end in the input region 24. The waveguide structures 14b, 14c (each of which include material 18), which are both evanescently coupled to the main bus waveguide structure 14a, include tapers and bends or any combination thereof. More specifically, the waveguide structures 14b, 14c include adiabatic tapers 26 and adiabatic bends 28 in the input region. In embodiments, the bends of the waveguide structures 14b, 14c are optimized to minimize/eliminate back reflection to the main bus waveguide structure 14a. In alternative structures, the waveguide structures 14b, 14c can include any combination of adiabatic tapers and bends in the input regions. Moreover, the waveguide structures 14b, 14c can include any combination of configurations shown in FIGS. 3A-3H.

FIGS. 5A-5E show different, illustrative shapes (configurations) of the material 18 on the waveguide structures 14b, 14c, which can be implemented in any of the different aspects of the present disclosure as shown in FIGS. 3A-4. It should be understood that the different shapes (e.g., geometries) can be used to optimize the performance for either TM or TE modes of transmission. And, as shown in each of these embodiments, the material 18 does not coat the entire length of the waveguide structures 14b, 14c; instead, the material 18 is of such dimensions and/or geometry that light entering the waveguide structures 14b, 14c, as reflected outwards from the main bus waveguide 14a, will be attenuated to such an extent that it will not reflect back into the main bus waveguide 14a.

Figure 5A:
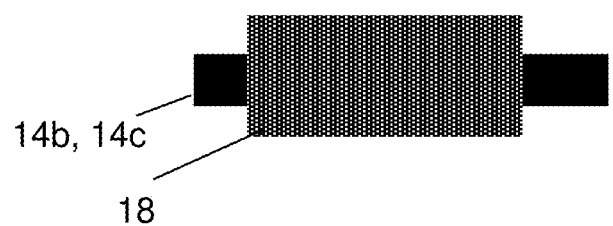
FIGS. 5A-5E show different, illustrative shapes (configurations) of vanadate material, which can be implemented in any of the different aspects of the present disclosure as shown in FIGS. 3A-4.
Figure 5B:
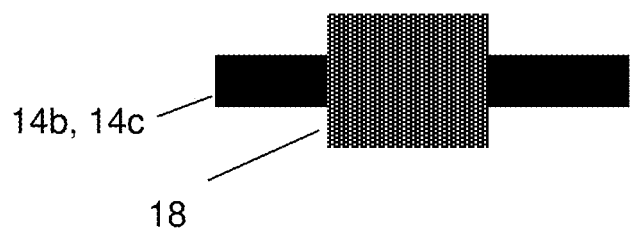
Figure 5C:
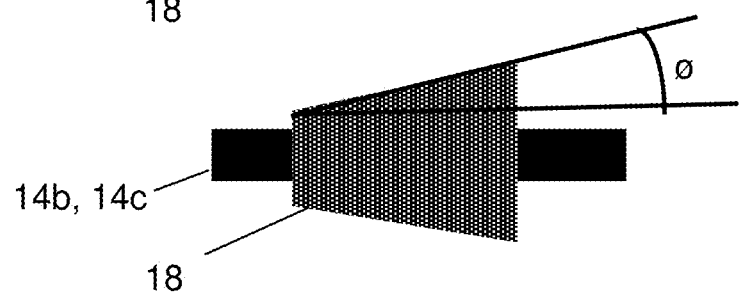
Figure 5D:
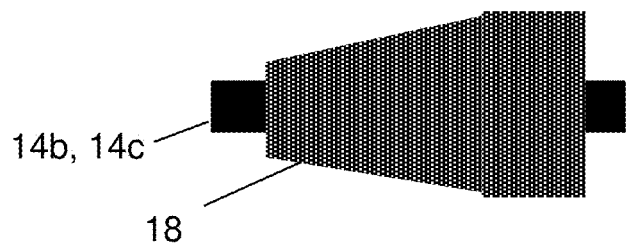
Figure 5E:
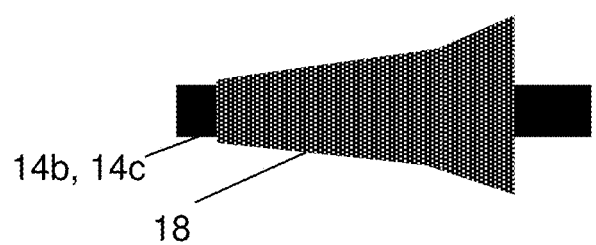

For example, in FIG. 5A, the material 18 is rectangular (with straight sidewalls). In FIG. 5B, the material 18 is square (with straight sidewalls). In FIG. 5C, the material 18 has tapered sidewalls. In this embodiment, the taper can have an angle of ø, which ranges from about 0° to 45°; although other dimensions are contemplated herein. In FIG. 5D, the material 18 has a single taper with a straight section. In FIG. 5E, the material 18 has a composite taper, e.g., two different angles of its sidewalls.

Table 1 below shows improved performance of a photonics device, e.g., waveguide structure, implementing the absorbers shown and described in the present disclosure. More specifically, Table 1 shows a comparison of a photonics device, e.g., waveguide structure, implementing the waveguide absorber shown in FIG. 3A-4 to that of a process of record for both TE and TM modes.

TABLE 1

|  | POR Absorber (TE) | POR Absorber (TM) | Vanadate Absorber (TE) | Vanadate Absorber (TM) |
| --- | --- | --- | --- | --- |
| Back Reflection (dB) | −18.7 dB | −30 dB | −56 dB | −56 dB |
| Insertion loss/attenuation (dB) | −4.7 dB | −3.1 dB | −43 dB | −45 dB |

The waveguide attenuators can be utilized in system on chip (SoC) technology. It should be understood by those of skill in the art that SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also commonly used in embedded systems and the Internet of Things.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising a hybrid attenuator comprising waveguide structures that evanescently couple to a main bus waveguide, wherein each waveguide structure of the hybrid attenuator have different geometries and associated materials structured in a way that results in transverse-electric (TE) mode and transverse-magnetic (TM) mode attenuation.

2. The structure of claim 1, wherein the material is a vanadate material which partially coats the first hybrid waveguide structure and the second hybrid waveguide structure.

3. The structure of claim 2, wherein the waveguide structures comprise:
    a first hybrid waveguide structure evanescently coupled to the main bus waveguide; and a second hybrid waveguide structure evanescently coupled to the main bus waveguide.

4. The structure of claim 3, wherein the first hybrid waveguide structure comprises a first geometry that has sidewalls are thicker than sidewalls of a second geometry of the second hybrid waveguide structure.

5. The structure of claim 3, wherein a geometry of the second hybrid waveguide structure includes a top portion on the second hybrid waveguide that is thicker than a top portion of a geometry of the first hybrid waveguide structure.

6. The structure of claim 3, wherein the first hybrid waveguide is devoid of the material on the top portion.

7. The structure of claim 3, wherein the material is partially or fully across a width on a top portion on the second hybrid waveguide and the first hybrid waveguide structure is devoid of the material on a top portion.

8. The structure of claim 3, wherein the first hybrid waveguide structure is a slotted structure.

9. The structure of claim 3, further comprising an insulator material under the material of both the first hybrid waveguide structure and the second hybrid waveguide structure, wherein the insulator material is thicker on a top surface of the second hybrid waveguide structure than on a top surface of the first hybrid waveguide structure.

10. The structure of claim 3, wherein the first hybrid waveguide structure and the second hybrid waveguide structure include adiabatic bends.

11. The structure of claim 3, wherein the main bus waveguide structure includes a taper at its input end.

12. The structure of claim 3, wherein the second hybrid waveguide structure is a stacked structure comprising a crystallized semiconductor material under the material.

13. The structure of claim 3, wherein the main bus waveguide structure, the first hybrid waveguide structure and the second hybrid waveguide structure comprise semiconductor substrate material monolithically integrated into semiconductor on insulator (SOI) technologies.

14. A structure comprising:
a first waveguide structure which is partially coated with a polarization-independent transparent conductive material; and
a second waveguide structure which is partially coated with the polarization-independent transparent conductive material, differently than the first waveguide structure,
wherein the polarization-independent transparent conductive material has a geometry that attenuates a transverse-electric (TE) mode of transmission for the first waveguide structure and attenuates a transverse-magnetic (TM) mode of transmission for the second waveguide structure.

15. The structure of claim 14, wherein the polarization-independent transparent conductive material is a vanadate based material.

16. The structure of claim 14, further comprising a third first waveguide structure which evanescently couples and reflects light to the first waveguide structure and the second waveguide structure.

17. The structure of claim 16, wherein the third waveguide structure is devoid of the polarization-independent transparent conductive material.

18. The structure of claim 16, wherein the third waveguide structure has a tapered input end and the first waveguide structure and the second waveguide structure have adiabatic bends.

19. A structure, comprising:
a first hybrid waveguide structure comprising semiconductor material monolithically integrated into SOI technology, the first hybrid waveguide structure further comprising a partial coating of vanadate based material which has a first geometry structured to prevent reflection back to a main bus waveguide structure; and
a second hybrid waveguide structure comprising the semiconductor material monolithically integrated into the SOI technology, the second hybrid waveguide structure further comprising a partial coating of vanadate based material which has a geometry different than the first geometry and which is structured to prevent reflection back to the main bus waveguide structure.

* * * * *